United States Patent
Wiegers et al.

(10) Patent No.: US 7,816,881 B2
(45) Date of Patent: Oct. 19, 2010

(54) METHOD AND APPARATUS FOR UTILIZING COMMUTATION SENSORS FOR SPEED AND POSITION CONTROL

(75) Inventors: John P. Wiegers, Shoreview, MN (US); Eric A. Hiner, Carver, MN (US); William Joseph Zerull, Minneapolis, MN (US)

(73) Assignee: Exlar Corporation, Chanhassen, MN (US)

( * ) Notice: Subject to any disclaimer, the term of this patent is extended or adjusted under 35 U.S.C. 154(b) by 304 days.

(21) Appl. No.: 11/824,399

(22) Filed: Jun. 29, 2007

(65) Prior Publication Data

US 2008/0012522 A1 Jan. 17, 2008

Related U.S. Application Data

(60) Provisional application No. 60/817,841, filed on Jun. 29, 2006.

(51) Int. Cl.
*G05B 1/06* (2006.01)
(52) U.S. Cl. .................. 318/638; 318/652; 318/560
(58) Field of Classification Search .............. 318/638, 318/652, 560
See application file for complete search history.

(56) References Cited

U.S. PATENT DOCUMENTS

| 4,528,486 | A | * | 7/1985 | Flaig et al. ............. 318/400.21 |
| 5,491,372 | A |   | 2/1996 | Erhart |
| 5,557,154 | A |   | 9/1996 | Erhart |
| 5,600,218 | A | * | 2/1997 | Holling et al. ......... 318/400.04 |
| 5,767,639 | A | * | 6/1998 | Sakaguchi et al. ..... 318/400.11 |
| 5,995,710 | A | * | 11/1999 | Holling et al. ............. 388/811 |
| 6,043,619 | A | * | 3/2000 | Gleim ..................... 318/400.2 |
| 6,091,216 | A | * | 7/2000 | Takahashi et al. ...... 318/400.09 |
| 6,497,035 | B1 | * | 12/2002 | Ratliff ......................... 29/596 |

* cited by examiner

*Primary Examiner*—Bentsu Ro
*Assistant Examiner*—David S Luo
(74) *Attorney, Agent, or Firm*—Merchant & Gould P.C.

(57) ABSTRACT

One or more magnets are mounted on the rotor of a motor/actuator and analog Hall Effect sensors are mounted on the stator of the motor actuator to provide the necessary feedback for both speed and position control of the rotor. The feedback system includes signal conditioning circuitry for conditioning the sinusoidal signal produced by the magnet and the Hall Effect sensors and a tracking converter observer algorithm executing on the system microprocessor to produce controlled motion. The controller (and other electronics) may be integrated into the housing of the motor or actuator to provide a compact, efficient system for use in a number of applications.

18 Claims, 14 Drawing Sheets

Analog Hall Effect Sensor 2 pole ring magnet mounted on the rear of servo motor rotor 0 degrees    90 degrees    180 degrees    270 degrees Hall output vs magnet position

*Amplifier and Signal Conditioning block diagram*

*Closed loop tracking converter block diagram* 34

FIG.14

Start |Monitor| I/O | Jog |Control|Home |Two Move Setup| ← 52

| | Clamp | Unclamp |
|---|---|---|
| Move Typ | Absolute (+ dir ▼ | Absolute Positio ▼ |
| Position | 3.500 | 0.0000 |
| Velocity | 5.0 | 5.0 |
| Accelerati | 100.0 | 100.0 |

| | | |
|---|---|---|
| Feed Type | Feed (+) ▼ | (none) ▼ |
| Feed Velo | 2.0 | 0.0000 |
| Current Li | 7.6 | 0.0 |
| Terminatio | none (Hold Force ▼ | none (force fore ▼ |

METHOD AND APPARATUS FOR UTILIZING COMMUTATION SENSORS FOR SPEED AND POSITION CONTROL

CROSS-REFERENCE TO RELATED APPLICATIONS

This application claims the benefit of U.S. Provisional Application No. 60/817,841, filed Jun. 29, 2006. Such application is incorporated herein by reference.

FIELD OF THE INVENTION

The invention relates generally to the field of rotary to linear actuators; more particularly to a servo feedback system; and more particularly still to a servo system employing commutation sensors for both speed and position control.

BACKGROUND OF THE INVENTION

In brushless motor systems the motor rotor position must be sensed for commutation and position/speed control. Traditionally this has been accomplished with a combination of digital Hall sensors & incremental encoders, absolute encoders or resolvers.

Historically in brushless motor systems, commutation sensors have been used for sensing the relative position of the rotor to the stator allowing the control to generate the magnetic fields required to produce motion of the rotor. Additionally servo systems have used a high resolution feedback to supply real time position or speed information to the controller. High resolution feedback produces a constant supply of position information allowing the control to make continuous adjustments to speed, thus maintaining the desired motion/position.

Incremental encoder systems are required to provide two separate signal types to the controller, commutation signals and high resolution signals. This can be accomplished with separate Hall Effect digital switches for the commutation signals with the encoder providing the high resolution signals. Some encoders provide separate commutation outputs built into the encoder eliminating the need for separate Hall Effect switches as shown in FIG. 1. The commutation outputs are absolute over 1 electrical cycle of the motor (referred to as U,V and W in FIG. 1) these sense the mechanical alignment of the motor's rotor relative to the stator. The encoder incremental outputs (referred to as A and B in FIG. 1) are 90 degrees out phase from each other and provide rotation direction and high resolution feedback used by the control for position and speed control.

A resolver, on the other hand, is a multi-winding transformer in which the output ratio varies with rotor position. A typical resolver is illustrated in FIG. 2. Typically, this system requires a reference frequency, shown in FIG. 2 as the oscillator, and requires a resolver to digital converter integrated circuit for interface to a processor.

Encoder and resolver based systems are complex systems resulting in high cost components, requiring a larger number of connections, and adding to the overall length and weight of the motor. Accordingly, there is a need in the art for a lower cost, less-complicated motor feedback system that provides both the commutation signals required for controlling the motor and high resolution signals necessary for position/speed control.

In many applications, linear actuators are necessary or desired to provide a reciprocating motion through an actuator member as that member is moved through an actuation stroke. Examples of known linear actuators are U.S. Pat. Nos. 5,491,372 and 5,557,154. Actuators oftentimes do not require the precision or cost of prior art high resolution encoders and resolvers. This is due to, among other factors, feed to force control, the relatively large reduction ratio (e.g., 10:1 or 4:1), and/or the relatively simple point to point motion of an actuator. In the case of motion, this may be contrasted with synchronization of multiple axes in many servo motor systems.

Therefore, a need exists for a linear actuator apparatus and system which offers position/speed control and which addresses the foregoing shortcomings.

SUMMARY OF THE INVENTION

The present invention provides a solution to the drawbacks of the prior art by providing a linear actuator system which utilizes inexpensive sensors to provide both commutation and the position information necessary to control the system. To do so, a preferred system constructed according to the principles of the present invention utilize one or more magnets mounted on the rotor of the motor/actuator and one or more analog Hall Effect sensors mounted on the stator of the of the motor to provide the necessary feedback for both control of the rotor and position/speed control.

According to one aspect of the present invention the feedback system includes signal conditioning circuitry for sinusoidal output produced by the magnet and Hall Effect sensors and a tracking converter observer algorithm executing on the system microprocessor to produce controlled motion.

Advantages of the present invention include a lower cost than either an encoder or a resolver based system as well as smaller size and lower weight. For example, a magnet and the necessary hall sensor(s) are low cost items compared to a resolver or encoder. Also the, the magnetic feedback subsystem uses fewer connections.

Another feature of the present invention is that the controller (and other electronics may be integrated into the housing of the motor or actuator. This provides a compact, efficient system for use in a number of applications.

A preferred environment in which the present invention may be employed is with an electrically powered, bi-directional linear actuator of relatively small size (length and diameter) in which the threads of the drive member and its follower are not exposed and where all force bearing components are concentrically connected to a load. The actuator includes an actuator assembly having an output shaft, an electric motor assembly (having a stator) and a housing assembly. The output shaft of the actuator assembly is moved between retracted and extended positions by the electric motor assembly. Specifically, rotation of the armature drive cylinder under the influence of the stator's magnetic forces produces a corresponding rotation of the armature drive cylinder threaded bore. Engagement of the threads of the armature drive cylinder with those of the output shaft assembly provides a corresponding linear movement in the output shaft. The thread engaging portion of the actuator assembly is significantly shorter than the extent of the threaded bore of the armature drive cylinder with that difference in length defining a maximum actuation stroke of the actuator.

Therefore, according to one aspect of the invention, there is provided a servo system, comprising: a housing assembly; an energizable stator supported by the housing assembly; a shaft rotatably mounted within the housing assembly, the shaft being coupled to a rotor which is magnetically driven, wherein rotation is imparted to the rotor and thereby to the shaft when the stator is energized; a rotary to linear conversion device connected to the shaft; a magnet mounted on the shaft; an analog Hall sensor mounted on the housing assembly for sensing the magnet, wherein the sensor provides an output signal; and a controller for energizing the stator and for receiving the output signal, wherein the controller determines the position of the magnet with respect to the stator from the output signal, and the speed and position of the rotor is controlled from that information.

According to another aspect of the invention, there is provided a servo control system for a linear actuator, comprising: a housing assembly; an energizable stator supported by the housing assembly; an elongated input shaft rotatably supported relative to the housing, the input shaft having at least a threaded portion, an elongated translating output cylinder with an internally threaded bore, and a roller assembly, the roller assembly including camming surfaces for engaging the threaded portion of the input shaft and the output cylinder, wherein the internal threads of the output cylinder contacting the camming surfaces move the transmission rollers along the threaded extent of the output cylinder in response to the selective rotation of the input shaft, the shaft being coupled to a rotor which is magnetically driven, wherein rotation is imparted to the rotor and thereby to the shaft when the stator is energized; a magnet mounted on the shaft; a first and second analog Hall sensor mounted on the housing assembly for sensing the magnet, wherein the sensor provides an output signal; and a controller for energizing the stator and for receiving the output signal, wherein the controller determines the position of the magnet with respect to the stator from the output signal, and the speed and position of the rotor is controlled from that information.

According to further aspects of the invention recited in the previous paragraph, a linear position transducer may be cooperatively connected to the output cylinder, where the transducer arranged and configured to provide an actual physical position of the output cylinder. In such a system, the linear position transducer may include a sensing rod and a magnet located within the output cylinder, the sensing rod being fixed to the housing and the magnet being fixed to the output cylinder, wherein the magnet moves along the sensing rod during reciprocal movement of the output cylinder rod.

According to another aspect of the invention, there is provided a method of determining the position of a rotor relative to a stator with a high degree of resolution, comprising: locating one or more magnets mounted on the rotor; detecting the rotation of the magnet with an analog Hall sensor mounted on the stator and generating an output signal; and determining the position of the magnet with respect to the stator from the output signal, wherein the speed and the position of the rotor is controlled from that information.

While the invention will be described with respect to preferred embodiment configurations and with respect to particular devices used therein, it will be understood that the invention is not to be construed as limited in any manner by either such configuration or components described herein. Also, while particular types of working environments and materials are described herein, it will be understood that such environments and materials are not to be construed in a limiting manner. Instead, the principles of this invention extend to any working environment in which controlled motion is desired. These and other variations of the invention will become apparent to those skilled in the art upon a more detailed description of the invention.

The advantages and features which characterize the invention are pointed out with particularity in the claims annexed hereto and forming a part hereof. For a better understanding of the invention, however, reference should be had to the drawings which form a part hereof and to the accompanying descriptive matter, in which there is illustrated and described a preferred embodiment of the invention.

BRIEF DESCRIPTION OF THE DRAWINGS

In the drawings in which like elements are identified with the same designation numeral:

FIG. 14 illustrates a user input/output window of a PC set-up software that can be used with the servo motor system of the present invention;

DETAILED DESCRIPTION

Figure 1:
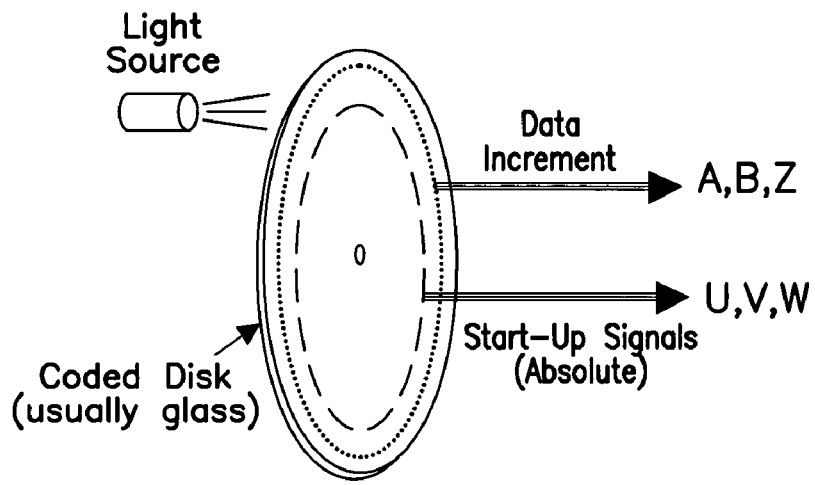
FIG. 1 is a diagrammatic view of a typical prior art encoder for use in a servo motor feedback system.
Figure 2:
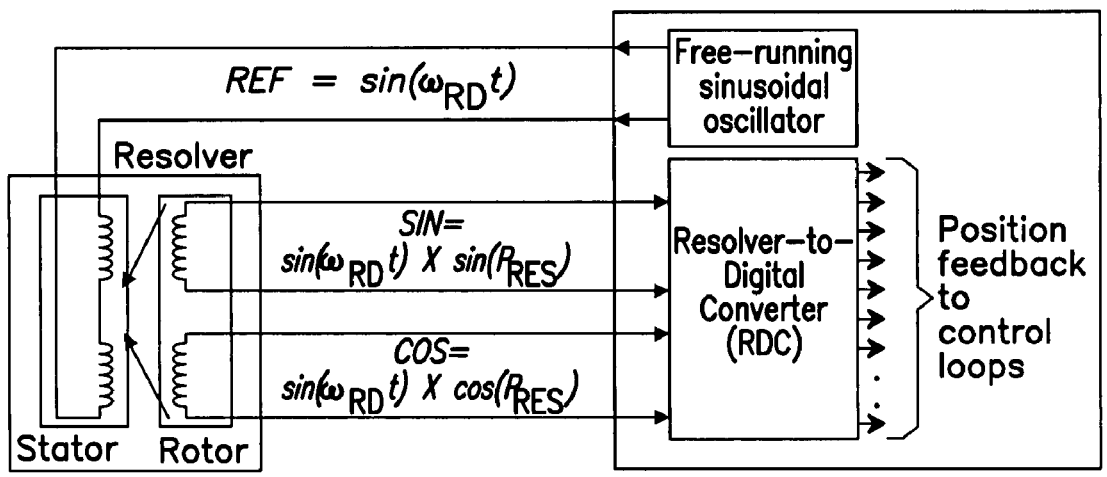
FIG. 2 is a diagrammatic view of a typical prior art resolver for use in a servo motor feedback system.

The above and below specification, examples and data provide a complete description of the manufacture and use of the composition of the invention. Many embodiments of the invention can be made without departing from the spirit and scope of the invention.

In a preferred embodiment constructed in accordance with the principles of the present invention, the present invention provides an electrically powered linear actuator. An electronic controller and servo amplifier may be embedded in the same housing as the actuator. The embedded controller monitors signals from analog Hall Effect sensors which are mounted and aligned in a position corresponding with the commutation points of the rotor. The motor commutation points, or Hall Effect sensor transitions are equally spaced throughout one motor revolution. This data (e.g., the Hall transitions) is sensed by the controller to determine the position of the rotor relative to the housing. By using this feature, the need for high resolution rotary position sensors such as encoders and resolvers is eliminated.

Programming and set up of the controller is accomplished by connecting the embedded controller to an intelligent device (e.g., a personal computer or programmable logic controller) via a serial interface, whereby data and commands are transmitted in serial fashion back and forth between the programming device and the controller. Preferably, the controller includes means for retaining the loaded information even upon power loss in order to assure the motion control instructions are available at all times upon command by the user or by an external controller. One or more external controllers may communicate in real time on performance, status, diagnostics and other information with the embedded controller via discrete input and output and/or a serial interface connection, as established during set-up and programming.

The linear actuator in the current invention utilizes a roller screw rotary to linear conversion mechanism to accurately and reliably translate the rotary motion of the motor's rotor to a linear output which is more useable than rotary motion in many machine and process applications. Generally, actuators of this style include a housing assembly; an energizable stator supported by the housing assembly; an elongated input shaft rotatably supported relative to the housing; a roller assembly; and an elongated translating output cylinder. The input shaft has at least a threaded portion. The elongated translating output cylinder includes an internally threaded bore. The roller assembly includes camming surfaces for engaging the threaded portion of the input shaft and the output cylinder, wherein the internal threads of the output cylinder contacting the camming surfaces move the transmission rollers along the threaded extent of the output cylinder in response to the selective rotation of the input shaft. The shaft is coupled to a rotor which is magnetically driven, wherein rotation is imparted to the rotor and thereby to the shaft when the stator is energized Such an actuator is generally described in U.S. Pat. Nos. 5,491,372 and 5,557,154, and is commercially available from Exlar Corporation, of Chanhassen, Minn. Such patents are incorporated herein by reference and made a part hereof.

Figure 15:
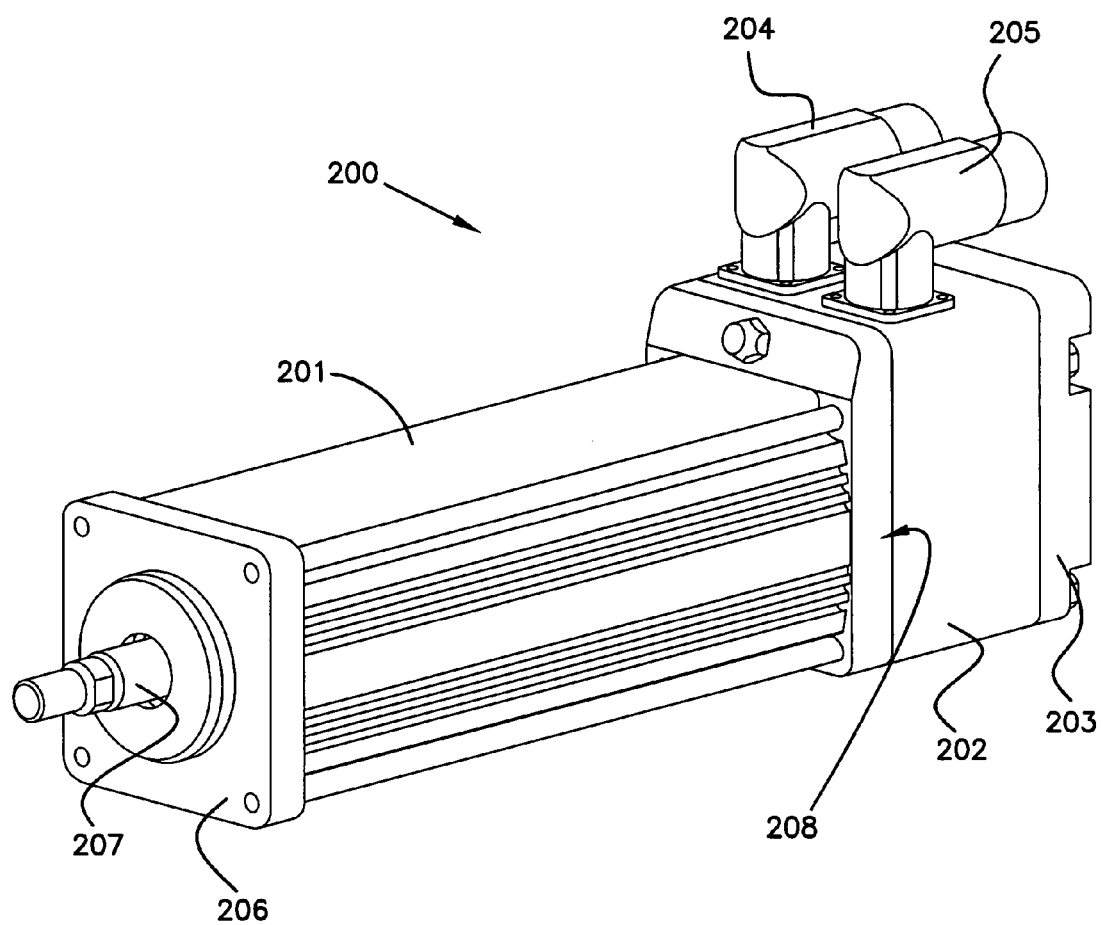
FIG. 15 illustrates a linear actuator constructed in accordance with the principles of the present invention.

A representative actuator is illustrated in FIG. 15 at 200. The various actuator components reside within housing 201. Mounting plate 206 acts as an end plate and mounting bracket for the actuator 200. The electronics (discussed below) reside within electronics housing 202. Access to the electronics may be accomplished by removing end plate 203. Additional access may be accomplished by making a portion of the electronics housing 202 removable (best seen at designation 208). Power connections to the actuator are provided at connector 204 and communications connections are provided at connector 205. The output rod is designated at 207.

Figure 3:
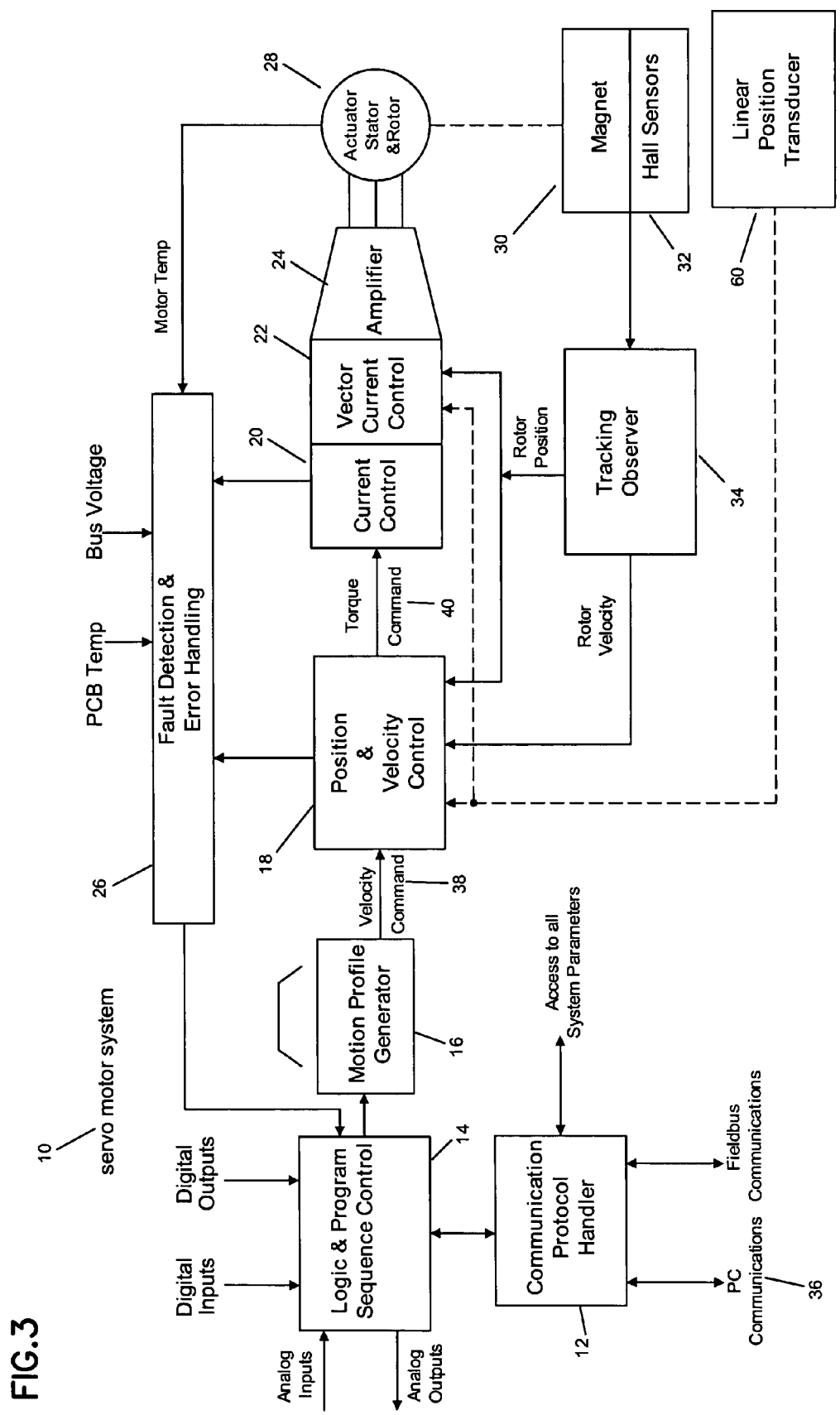
FIG. 3 is a block diagram illustrating the individual components of the servo motor system of the present invention.

Referring now to FIG. 3, a block diagram of the individual components of the servo motor system 10 of the present invention is illustrated. The servo motor system 10 includes, among other components, a communication protocol handler 12, a logic and program sequence control subsystem 14, a motion profile generator 16, a position and velocity control subsystem 18, a current control subsystem 20, a vector current control subsystem 22, an amplifier 24, a fault detection and error handling subsystem 26, an actuator stator and rotor 28 (which may be referred to for convenience as actuator 28, herein), magnet 30 and Hall sensor(s) 32, and a tracking observer 34.

The communication protocol handler 12 of the servo motor system 10 controls the input of the controller parameters. In the preferred embodiment, the handler 12 acts as a slave device receiving queries and commands from a master device (e.g., a personal computer, controller, controller area network or other fieldbus communication). The default communication protocol may be Modbus RTU using an RS485 hardware layer. However, it will be appreciated by those of skill in the art that other options are possible. Every parameter in the controller may have an associated Modbus register number, some parameters being read/write and some being reserved as read-only. The parameters may be set-up by a user interface software running on a PC 36 as required for specific applications. Because of the standard Modbus interface, the parameters can also be accessed by other devices such Human Machine Interfaces (HMI) or Supervisory Control and Data Acquisition (SCADA) host controls for process monitoring and parameter adjustments.

The logic and program sequence control subsystem 14 controls starts, stops and mode changes from the inputs and commands from Modbus registers. The logic and program sequence control subsystem 14 sets outputs based on internal status or values. The logic and program sequence control subsystem 14 may also have the capability of controlling sequences of moves and mode changes.

Referring next to the motion profile generator 16 of the servo system 10 of the present invention, when a move is commanded to start (e.g., from the logic and sequence control subsystem 14), the motion profile generator 16 calculates the commanded delta position for each loop update (preferably at a very fast rate, such as every 200 µsec), following the programmed acceleration and deceleration rates.

The position and velocity control subsystem 18 of the servo motor system 10 receives the delta position command from the motion profile generator 16. Since the delta position is over a known time interval, it can be used to calculate a velocity command 38. The position and velocity control subsystem 18 also receives position and velocity feedback from the tracking observer 34. Alternatively, a physical linear position transducer 60 (such as the commercially available magnetostrictive linear-position sensor manufactured by MTS Systems Corporation of Eden Prairie, Minn. under the designation Temposonics®) may provide the actual position feedback, as will be discussed in more detail below. While preferably the position and velocity control subsystem 18 may use a traditional third order control algorithm to generate a torque command output 40, other control algorithms may be used including second order algorithms and adaptive control, among others.

For a given motor or actuator 28, the torque is directly proportional to current, so the current control subsystem 20 uses the torque command 40 from the position and velocity control subsystem 18 to produce the current required for the commanded torque. The current in each phase of the amplifier 24 is measured and fed back to the current control subsystem 20. The current control subsystem 20 uses a traditional second order control algorithm to control the current command output. However, other control alternative algorithms may be used.

The vector current control subsystem 22 receives the current command input and the rotor electrical angle position which are used to calculate a vectored 3-phase sinusoidal current command in the form of a pulse width modulated signal for each stator winding. The algorithm uses the rotor electrical angle position for commutation, to assure the current command is applied to appropriate winding for maximum torque.

The amplifier 24 receives the pulse width modulated command and uses it to switch transistors, such as MOSFET or IGBT power devices, that deliver the current to the stator winding. The actual current in each of the motor or amplifier legs is fed back to the current control subsystem 22.

The fault detection and error handling subsystem 26 of the servo system 10 monitors several of the key system parameters and compares them against predetermined limit values, some of which are set by user and others set at the factory. The action taken is dependent on the severity of the fault. Some sample faults may include over temperature of the control circuits, over temperature of the stator windings, over voltage, over current, follower error, and position feedback fault.

It will be appreciated that the motion control components provide the environment with which, and the system in which, the principles of the present invention may be employed. Therefore, a more detailed description of the present invention will be deferred pending a brief discussion of the basic working of the motion control components of the servo system 10.

In the environment in which the present invention is employed, user established motion programs are generally utilized. Such programs are a series of commands which define where the output rod on a linear actuator will be located at specified times through completion of the program. The program is generally initiated with receipt of a command from an operator control panel or external machine controller. The program also defines the velocities for the output rod. Additionally the program defines various decision points and methods for making such decisions by the controller depending on a combination of discrete input signals derived from the actuator (such as force, temp, etc.). The methods may include logic decisions as well as numeric calculations and comparison of data and set points.

The program may also establish a protocol for communication operating information, sequence location, and decisions between the motion controller and the operator control panel and/or external machine controller.

Figure 4:
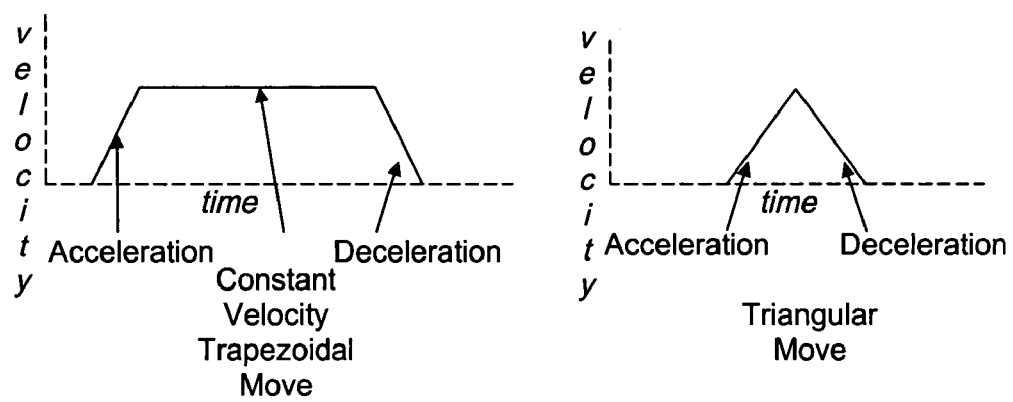
FIG. 4 illustrates two example motion profiles generated by the motion profile generator of the system of FIG. 3, one of the motion profiles being a trapezoidal profile, wherein maximum velocity has been reached, the other motion profile being a triangular profile, wherein maximum velocity has not been reached due to a short move.

The motion components include the motion profile generator 16, the position and velocity control subsystem 18, the current control subsystem 20, the vector current control subsystem 22, the amplifier 24, the actuator 28, the magnet 30 and Hall sensor(s) 32, and the tracking observer 34. The motion control is initiated by the motion profile generator 16, which generates the motion command 38. When a move is commanded, a motion profile is generated using the specified acceleration rate, maximum velocity, deceleration, and distance as shown in the trapezoidal profile of FIG. 4. For moves with a short distance, the maximum velocity may not be achievable while following the desired acceleration and deceleration rates. The result is a triangular move, as also shown in FIG. 4. In the profiles shown in FIG. 4, the area under each velocity profile is equal to the distance of the move.

The motion profile is updated at a specific rate. Preferably, the motion profile generator 16 calculates the delta position at a point in time for each processor update. During the acceleration portion of the move, the delta position is slightly larger for each update. The delta position is constant for each update during the constant velocity portion of the move and gets slightly smaller for each update during the deceleration portion of the move.

The position and velocity control subsystem 18 receives the delta position data and updates the current commanded position. The position and velocity control subsystem 18 also receives the rotor position and rotor velocity from the tracking observer 34 and updates the accumulated motor position, the difference between the command position and the actual measured position being called the following error. A third order filter algorithm is applied to the follower error to produce a torque command 40.

The current control subsystem 20 receives the torque command 40 and the measured current feedback. The difference between these is current error. This error is calculated at an even faster rate, typically 15 kHz. A second order filter algorithm is preferably applied to the current error to produce a current command. The vector current control subsystem 22, the amplifier 24, and the actuator 28 produce the torque needed to attempt to move the rotor. As the torque builds, the load will move, assuming it is free to do so. As the rotor moves, so moves the magnet 30 mounted on the rotor. The movement of the magnet 30 is detected by the position changes—as measured by the Hall sensors 32. The tracking observer 34 receives the Hall sensor output and thereby senses the change in rotor angle.

During the acceleration portion of the profile, the load will initially fall slightly behind the commanded position in the position and velocity control subsystem 18, resulting in an increased following error and increased torque command 40 until enough current is produced to overcome the inertia of the load. During the constant velocity portion of the profile, since the delta position command is constant, the torque command is constant and the commanded current is constant unless changes in the motor load cause it to fall behind. If the actuator 28 sees an increase in its load, momentarily slowing the actuator 28 down, it will be detected by the following error and the torque command 40 will be increased to compensate for the increase in the torque needed. This normally happens at high rates, typically, 2 kHz or faster, making the loop very responsive.

During the deceleration portion of the profile, the delta position command gets smaller and smaller, with each update resulting in a lower torque command 40. The inertia of the load will try to continue the motion. The rotor may get ahead of the commanded position causing a torque command 40 in the opposite direction to apply a braking torque. This will continue until the delta position is zero, i.e., the profile is complete. The position and velocity control subsystem will continue to compute the follower error and produce a torque command as required.

Figure 5:
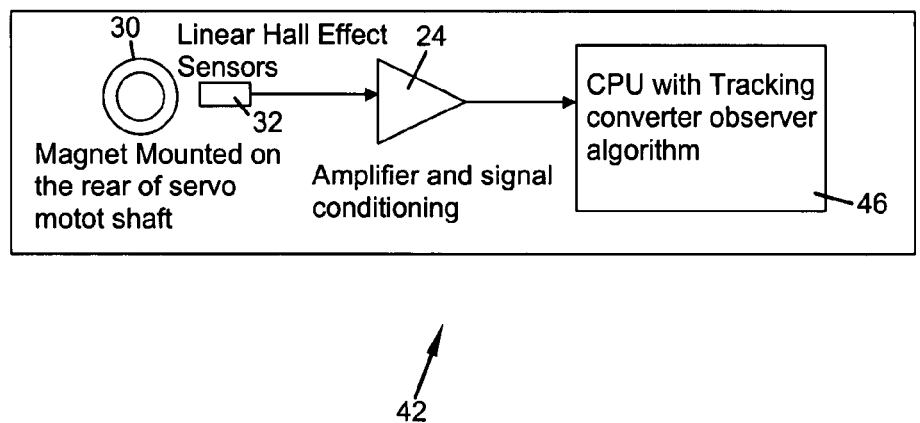
FIG. 5 is a diagram illustrating the magnetic feedback subsystem of the motor system of the present invention.

Referring now to FIG. 5, the magnetic feedback subsystem 42 of the servo system 10 is illustrated. As discussed above, servo systems require a sensing device on the actuator to provide the controller feedback of the rotor position for electronic commutation, velocity and position control. This has traditionally been accomplished with the combination of digital Hall switches and incremental encoders, absolute encoders or resolvers.

The magnetic feedback subsystem 42 of the present invention replaces traditional feedback components, and includes: 1) a magnet 30 mounted on the rotor of the actuator; and 2) analog Hall Effect sensor(s) 32. Signal conditioning circuitry 24 and a tracking converter observer algorithm executing on a system microprocessor 46 are utilized with the output of the Hall Effect sensor(s). The operation of the magnet 30 and the analog Hall Effect sensor(s) 32 is illustrated in greater detail in FIGS. 6-9.

Figure 6:
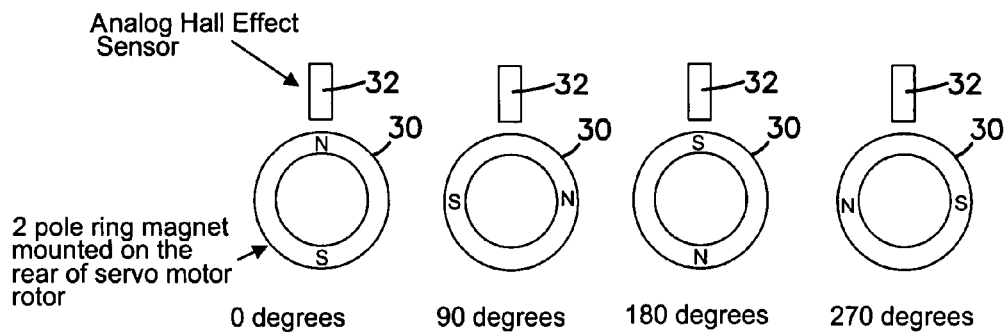
FIG. 6 illustrates the operation of the magnet and a single Hall Effect sensor of the magnetic feedback subsystem of FIG. 5.
Figure 7:
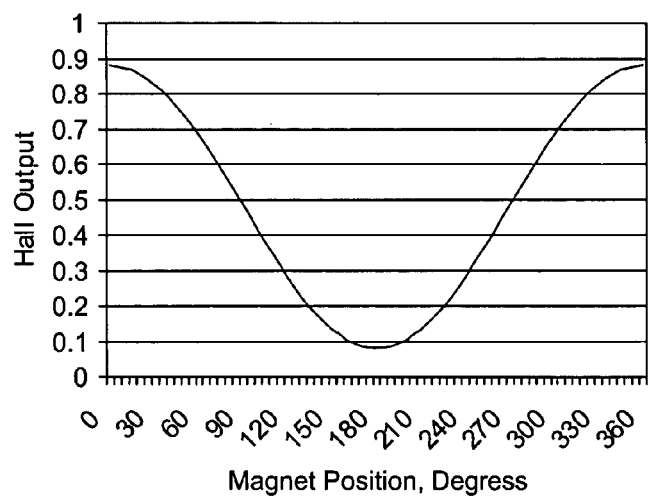
FIG. 7 illustrates a graph of Hall output versus magnet position of a single Hall effect sensor of FIG. 6.

Referring now to FIGS. 6-7, when a ring magnet 30 that has been magnetized diametrically is rotated, the magnetic field, as seen by radially positioned analog Hall Effect sensors 32, is sinusoidal. Thus, the output of the Hall sensor(s) 32 provides a sinusoidal signal as the rotor/magnet 30 is rotated. FIG. 7 illustrates the output of the Hall sensor 32 as the magnet rotates (e.g., the magnet rotates at the same rate as the rotor to which it is attached). FIG. 6A illustrates the relationship between the Hall sensor 32 and the North/South position of the magnet at 0 degrees, while the output at 0 degrees may be seen in FIG. 7. Similarly, FIG. 6B illustrates the relationship at 90 degrees, FIG. 6C illustrates the relationship at 180 degrees, and FIG. 6D illustrates the relationship at 270 degrees. FIG. 7 illustrates the output for each of these representative positions. However, it will be appreciated that FIG. 6 illustrates snapshots of positions, and that the actual output of the Hall sensor 32 is a sinusoidal wave as generally illustrated in FIG. 7.

Figure 8:
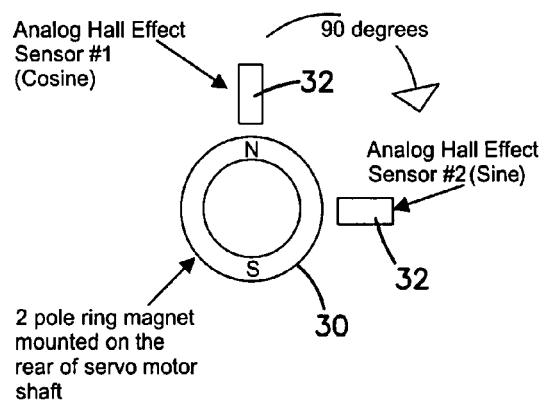
FIG. 8 illustrates the operation of the magnet and two Hall effect sensors of the magnetic feedback subsystem of FIG. 5.
Figure 9:
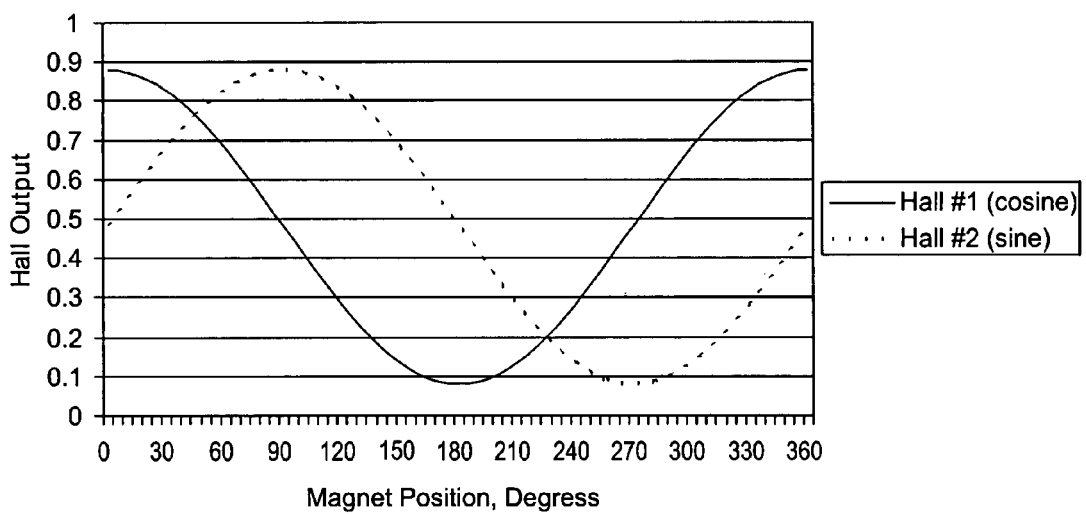
FIG. 9 illustrates a graph of Hall output versus magnet position of two Hall Effect sensors of FIG. 8.

Referring now to FIGS. 8-9, when two analog Hall sensors 32 are positioned 90 degrees apart (as illustrated in FIG. 8), two sinusoidal signals, 90 degrees out of phase, are generated (as illustrated in FIG. 9). Mathematically, these can be evaluated as sine (Sin θ) and cosine (Cos θ). It will be appreciated, however, that other physical angles might be utilized together with appropriate trigonometric functions.

Figure 10:
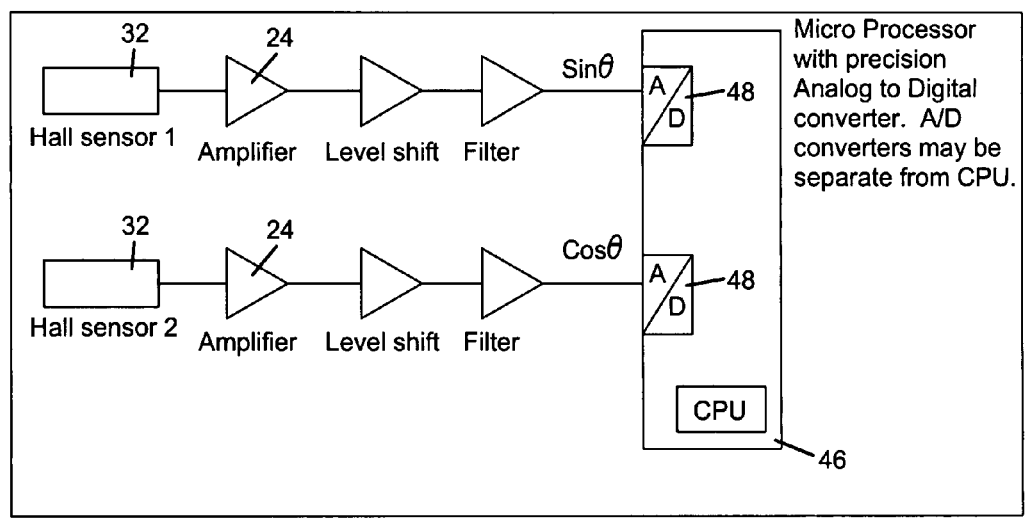
FIG. 10 is a block diagram illustrating the amplification and signal conditioning aspects of the servo motor system of the present invention.

Now referring to FIG. 10, the sinusoidal signal from the analog Hall sensors 32 requires amplification, level shifting, and filtering to deliver the proper range of voltage before it is converted from an analog signal to a digital value for processing. This conversion is accomplished by an analog to digital (A/D) converter 48 which is preferably on-board or contained in the CPU 46. Further, the A/D converter 48 preferably has the ability to sample the signals of both of the amplified, level shifted, and filtered Hall sensors 32 at the same instant in time. This provides zero time lag between measurements. However, a single ADC input to a processor might be utilized.

Depending on the speed of the device and the required accuracy of the movement, the time lag between measurements may be taken into account or ignored. In the preferred embodiment, after conversion, the digital values are offset and scaled to achieve values between −1 and 1.

Once the CPU 46 has a digital representation of the two sinusoidal waveforms (Sin θ and Cos θ), the angle of the rotor can be calculated at each processor update. This can be accomplished using direct trigonometric functions. However a closed loop tracking observer 34 may also be utilized. The tracking observer 34 has the advantage of yielding smooth and accurate estimations of both rotor angle and rotor speed.

Figure 11:
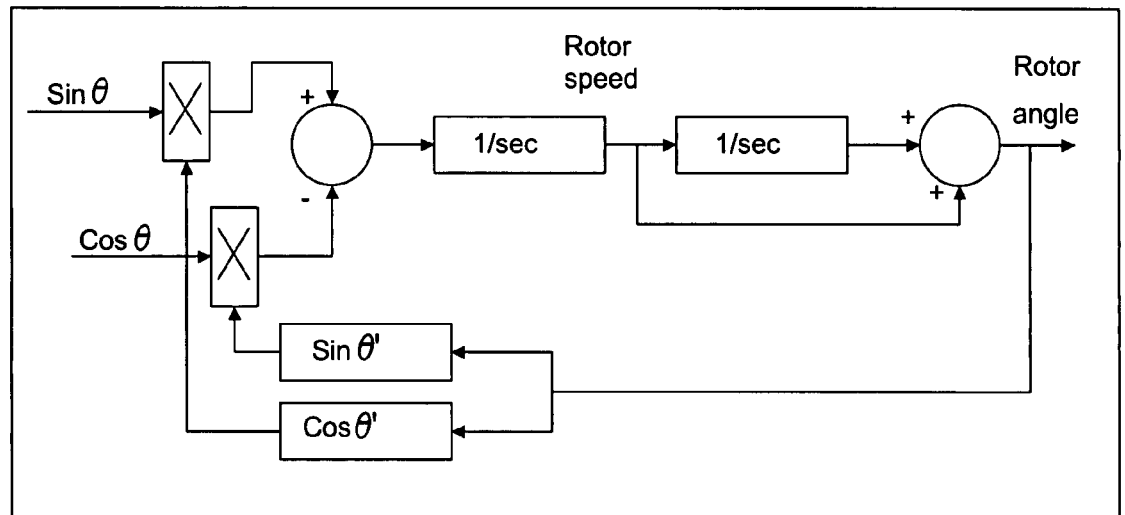
FIG. 11 is a block diagram illustrating the operation of the tracking observer of the servo motor system of the present invention.

Next referring to FIG. 11, operation of the tracking observer 34 is illustrated in greater detail. The tracking observer 34 is a closed loop measurement algorithm that has inputs from the Hall sensors 32, its outputs being rotor position and velocity. On initialization, the algorithm reads the scaled values of Sin θ and Cos θ inputs and calculates the trigonometric arctangent of the two values to determine the starting rotor position. This position is absolute within one revolution.

The tracking observer 34 samples the Sin θ and Cos θ inputs at a fast rate, typically about 15 kHz. Because of the high sample rate, changes in the rotor position from update to update will typically be small. The observer's velocity estimate will be used to calculate what the anticipated rotor position should be at the next update. The inverse sine and cosine of these estimated values are represented as Sin θ and Cos θ'.

These estimated values are cross multiplied with the inputs (Sin θ and Cos θ), using the difference of two angles formula for small angles. If there is no error, the velocity is constant. If there is error, indicating a change in velocity, the error per update represents acceleration. Based on the acceleration, the tracking observer loop continues to calculate new velocities and positions for the subsequent updates.

One of the largest benefits of the closed loop tracking observer 34 over the direct trigonometric function is the smoothing capability. This is achieved by the addition of a second filter to the tracking observer 34. The gain and dampening coefficients are selected for optimum smoothness and response of the observer outputs. The coefficients may be found empirically or in other understood manners, and preferably should be set to provide a bandwidth for the tracking observer of about 5 to 10 times the bandwidth of the position and velocity control loop to avoid lags and instabilities.

In the preferred embodiment, a microcontroller with a DSP (digital signal processor) core is utilized at the microprocessor. This type of microcontroller was selected since it eliminates many external peripheral components resulting in saving space and cost. The DSP was chosen to provide for fast execution of the math functions described herein for the motor control. Such a processor is manufactured by Freescale Semiconductor of Austin, Tex. under the designation DSP56801F. Other types of computers and controllers could also be used.

Alternative Embodiments

Figure 12:
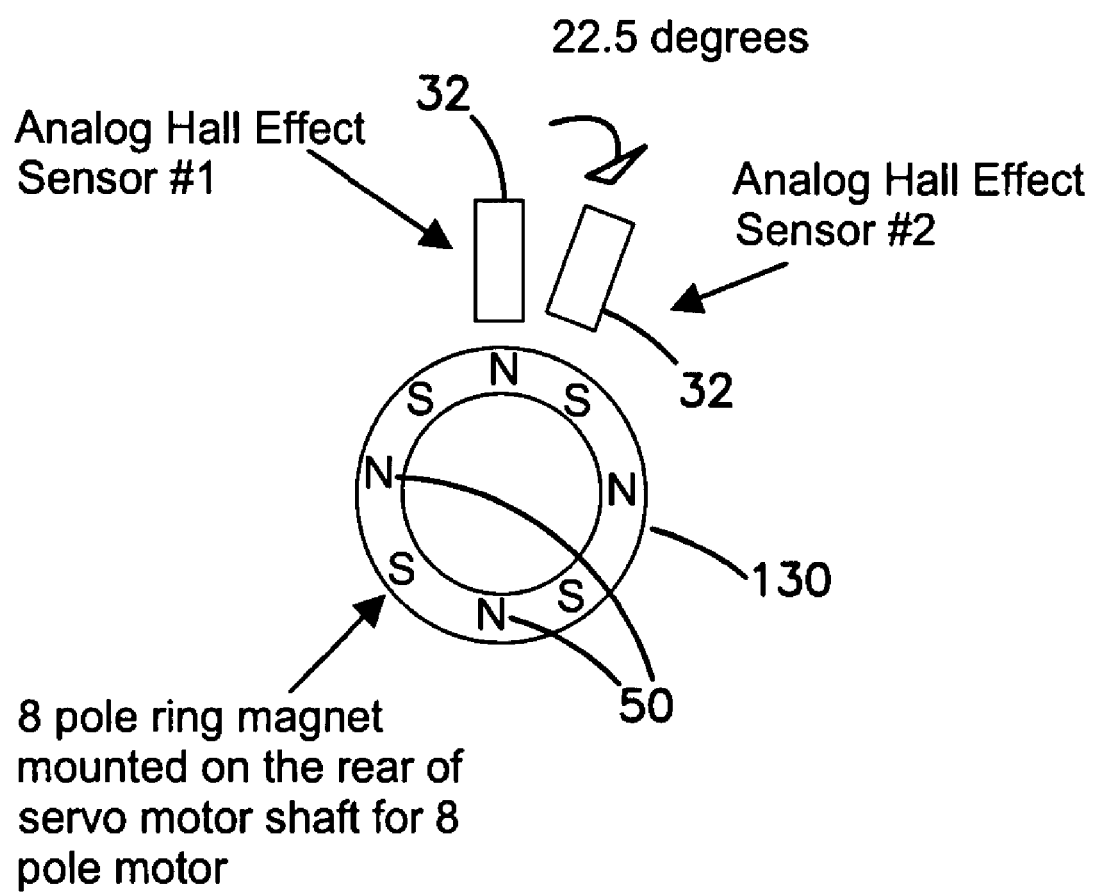
FIG. 12 illustrates another embodiment of a magnet and Hall sensor arrangement of the magnetic feedback subsystem of FIG. 5.

FIG. 12 illustrates an alternative embodiment of a magnet and Hall Effect sensor configuration of the magnetic feedback subsystem 42. The embodiment illustrated in FIG. 12 includes magnets 130 with multiple poles 50. Still continuing with FIG. 12, the number of magnet poles 50 matches the number of poles of the actuator motor. However, other configurations are possible (e.g., the number of magnet poles may be less than or equal to the number of motor poles, etc.). In this case, the Hall sensors 32 are positioned with a 90 electrical-degree offset instead of a 90 mechanical-degree offset. Other offsets may be utilized with a corresponding adjustment in the trigonometric functions.

Figure 13A:
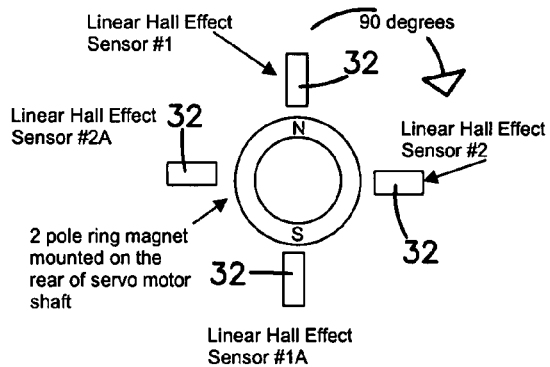
FIGS. 13A and 13B illustrate yet another embodiment of a magnet and Hall sensor arrangement of the magnetic feedback subsystem of FIG. 5, as well as a schematic illustration of the apparatus and method for electronically generating the difference between the two sensors.
Figure 13B:
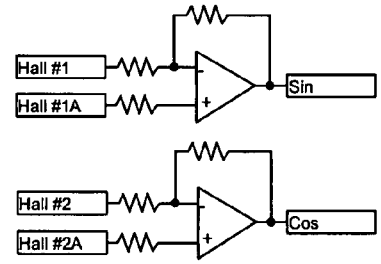

Another variation is illustrated in FIGS. 13A and 13B. In this embodiment, in order to offset the effects of mechanical tolerances, magnet inaccuracies, and stray magnetic fields, additional Hall sensors 32 are added opposite the existing sensors (180 degrees away) to form pairs. Thus, the sensors may be designated in pairs as 1 and 1A, 2 and 2A, etc. The Hall sensor signals from each of the opposing pairs are subtracted electrically to produce sine and cosine signals that reduce inherent inaccuracies. This is best seen in FIG. 13B where the signal from the Hall sensors 1 and 2 are subtracted from the signals from the Hall sensors 1A and 2A, respectfully.

Working Example

One example of an operational application of the servo system 10 of the present invention may be a clamping application. The application may allow for two move positions: 1) clamped (4.5 inch position) and 2) unclamped (0.0 inch position). In this application, at the clamped position, the actuator 28 is required to move up against a hard stop at the 4.5 inch position and hold it with a specified force or current. To avoid hitting the hard stop at full speed, a 'feed type' move is used, which reduces the velocity to the feed velocity at the specified position. Once the hard stop is hit, the actuator 28 holds the force until the retract move is activated Referring now to FIG. 14, using the PC set-up software 52, the user assigns the above input and output functions to the I/O points he/she has wired to. The inputs may be: 1) "Clamp" and 2) "Unclamp". The outputs may be: 1) "Ready", 2) "Clamped", or 3) "Unclamped". Home mode is set to perform an automatic home cycle on power-up, home to a specified force towards the unclamped position, and the home position is set to −0.1 inches. The clamp move is set to use the feed move feature and end at a specified force. The unclamp move is a normal absolute move to 0 position.

On power up, the fault detection and error handling subsystem 26 (best seen in FIG. 3) checks for faults, and, if there are none, the "Ready" output is turned on and the actuator 28 automatically starts a home move towards the unclamped position until the end of travel is hit, causing the motor/actuator current to build. The current is compared to the home force limit parameter, and, when the desired force is reached, the home move is complete and the current position is set to −0.1 inches.

When the "Clamp" input is activated, the actuator 28 moves towards the clamped position at the selected velocity of 5.0 inches per second. When the position of 3.5 inches is reached, the velocity ramps down to the feed velocity of 2.0 inches per second and proceeds at this speed until the hard stop is hit. The actuator 28 will continue to apply a force using 7.6 amps and turn on the "Clamped" output.

When the "Unclamp" input is applied, the "Clamped" output turns off and the motor/actuator 28 accelerates to 5.0 inches per second and stops at 0.0 inch or at unclamped position, wherein the "Unclamped" output is turned on. The actuator is ready for the next "Clamp" input to repeat the cycle.

Detecting A Reference Position

As will be appreciated, in a positioning system the controller must always know the position of the actuator relative to the application, for example a control valve is open, closed or at an intermediate position, such as 50% open. Typically each time power is applied an actuator must perform a 'Homing Cycle' to determine the "Reference Position" in reference to the application's coordinate system. This is done by means of moving the actuator (e.g., the actuator rod) until either a sensor is actuated or the end of the actuator stroke is reached and detected by a force limit. However, in many applications it is undesirable to perform a home cycle because the process which the actuator is controlling will not allow a home cycle. For example, in a valve application it may be undesirable for the valve to be required to move to the open or closed position looking for a home position sensor before it can be controlled. To avoid having to perform a home cycle, a method of absolute position feedback may be used. In this type of system, upon power up, the position of the actuator can be determined without actually moving the actuator first.

In the present invention, an absolute feedback sensor may be utilized to perform this function. Preferably in a linear actuator device, this may be accomplished with a magnetostrictive type device, such as the one manufactured by MTS Systems Corporation of Eden Prairie, Minn. under the Temposonics® designation. Other linear positioning devices are possible, such as an LVDT or variable resistor. The Temposonics® or magnetorestrictive device provides a compact size, simple mechanical and electronic interface, no moving parts and low cost.

Figure 17:
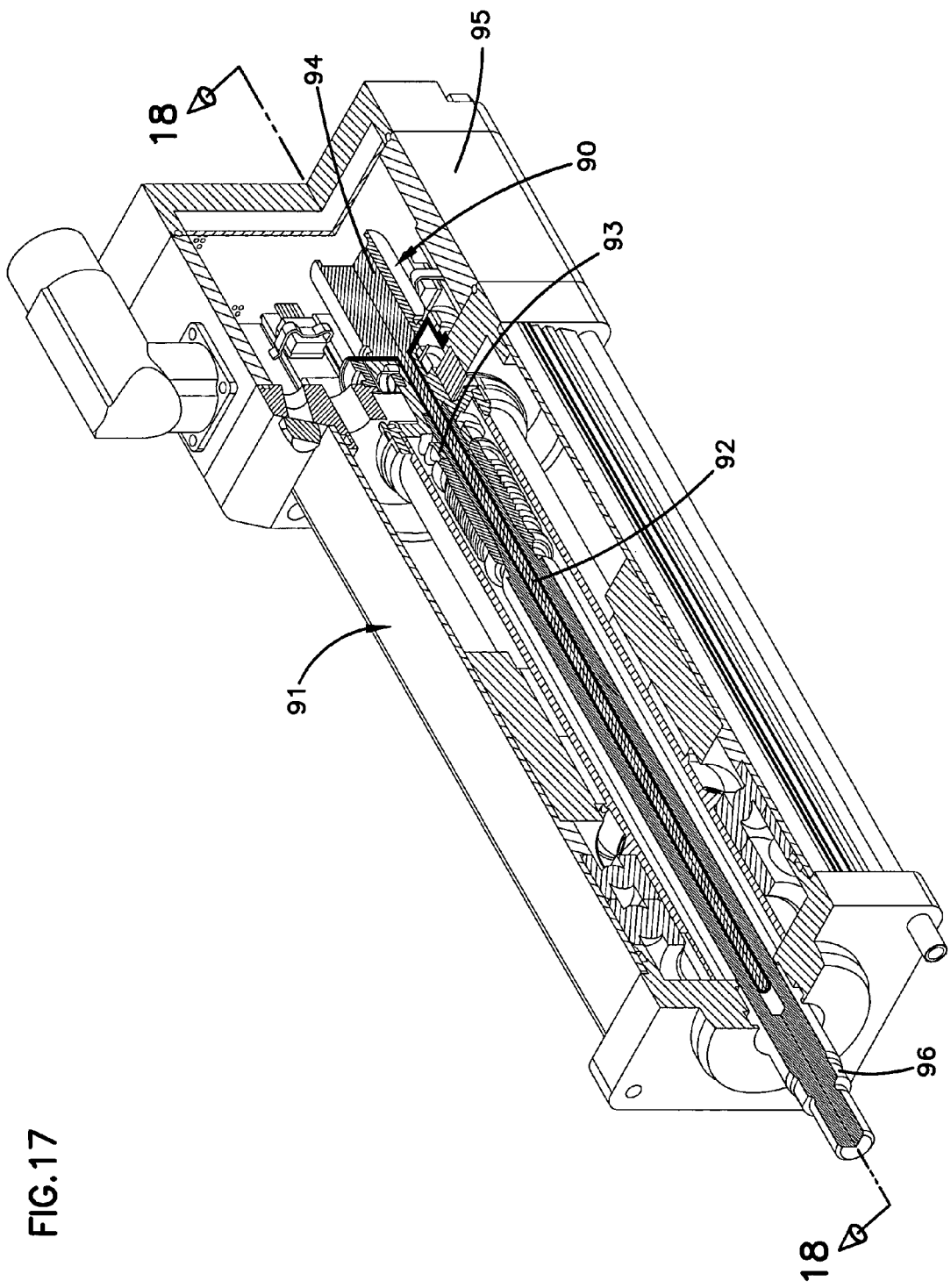
FIG. 17 illustrates a perspective view of a partially cutaway linear actuator illustrating a linear position transducer to provide actual position information.
Figure 18:
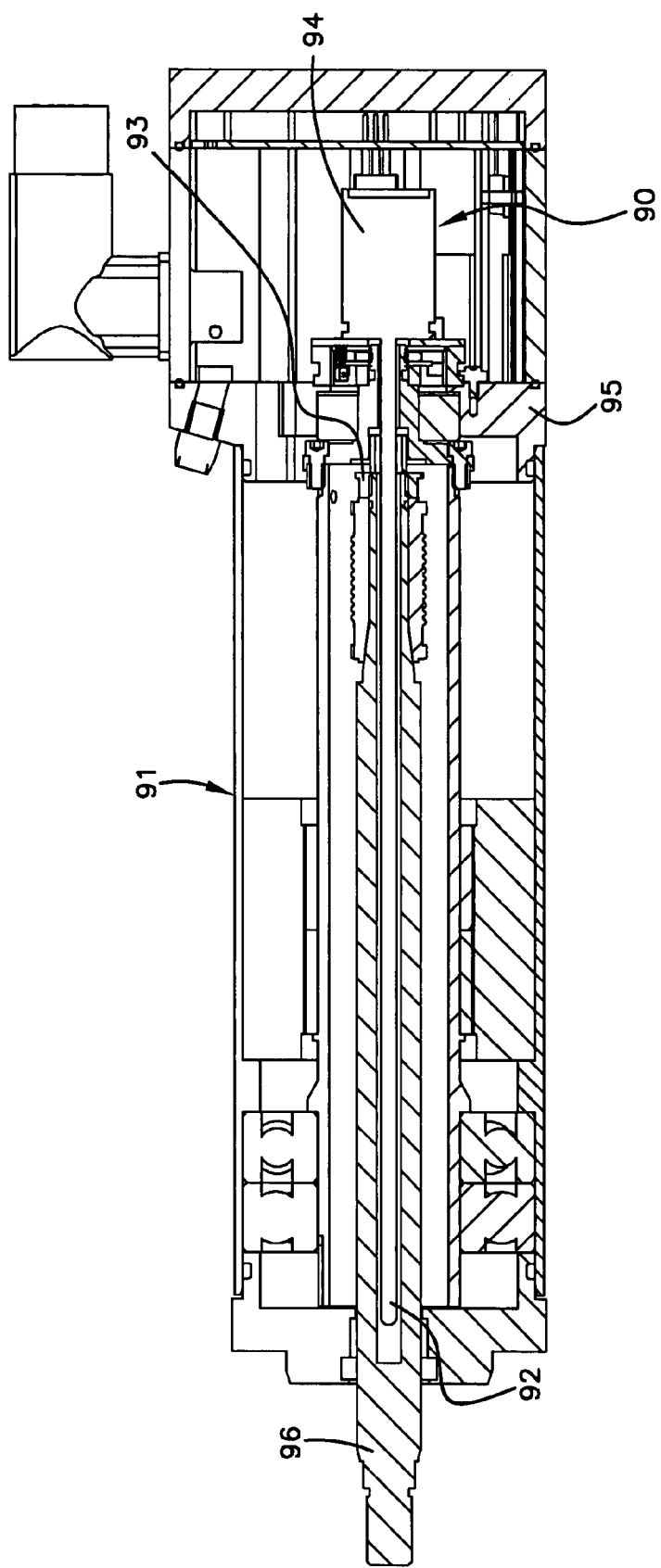
FIG. 18 illustrates a cross-section view of the linear actuator of FIG. 17 taken along the line 18-18 illustrating the linear position transducer to provide actual position information.

Turning now to FIGS. 17 and 18, a preferred embodiment is illustrated in which the transducer 90 is mounted in the actuator 91 such that the sensing rod (waveguide) 92 and magnet 93 are located inside the rod 96 of the actuator 91. The body 94 of the transducer 90 is fixed to the actuator body 95 and the magnet 93 is attached to the actuator rod 96. As the actuator rod 96 is moved the magnet 93 is moved along the sensing rod 92. The transducer 90 thereby measures the position of the magnet 93 and provides an electrical signal output proportional to the position of the magnet 93 on the sensing rod 92. This signal can be either in the form of an analog signal such as 0 to 10 volts, or a pulse width modulated signal. This signal is connected to the controller where it is scaled to directly represent the rod 96 position of the actuator 91. The output of the transducer 90 is represented at block 60 of FIG. 3 and is preferably provided to the position and velocity control block 18 and the vector current control block 22. For those wishing additional information on the operation of transducer 90, reference may be had to U.S. Pat. No. 5,545,984.

The actuator controller may use the position data 60 from the feedback transducer for the purpose of commutating the actuator motor and also for position and velocity control. The feedback from the transducer can fulfill one or several control system parameters, depending on the application.

First, the transducer 90 can be used in conjunction with a sensor on the actuator rotor, such as in the present invention. Here, the position measured by the transducer 90 is only read by the control system on power-up, providing a known starting position. From that point on the incremental data from the rotor sensor is used for positioning and velocity control as well as commutation.

Second, the transducer 90 can be use in conjunction with a sensor on the actuator rotor, such as in the present invention. In this case, the rotor sensors provide rotor position data for commutation and the transducer is used for all of the positioning & velocity control. This may be useful in cases where the linear transducer can provide higher resolution or accuracy than the rotor sensor.

Third, the transducer 90 can be used as the only feedback device. In this case the linear position of the actuator rod 96 must remain in direct proportion relative to the actuator motor rotor at all times. The proportion is typically determined by the lead of actuator. Typically this proportion is maintained by preventing the actuator rod 96 from rotating with the motor rotor. Since the rod position and rotor position are always at a known relationship, the transducer data 60 can be used for commutation as well as position and velocity control.

Many linear transducers specify an expected error based on temperature change (e.g., (n) microns per degree Celsius temperature rise). To improve accuracy, a temperature compensation algorithm is preferably used. In this case, a thermocouple (not shown) is mounted in the actuator to provide the necessary temperature information to scale the linear transducer 90 output 60 to allow for inaccuracies caused by temperature change.

Alternative Embodiments To Linear Absolute Feedback

Rotary absolute feedback devices can be used in place of linear transducers. These types of devices keep track of the rotor position with or without power applied. The rotary position can then be translated into linear position from the known actuator lead. In one preferred embodiment, a sensor/counter circuit is used to count rotor revolutions with and without control power applied. This may be accomplished using a small battery to provide back-up power to the counter and count sensors when the control power is removed (best seen in FIG. 16). Here, low power digital sensors 81 are mounted 90 degrees apart to generate quadrature signals to determine count and direction of rotation. The turns count information is used by the main controller and used in combination with the magnetic feedback system 42 (best seen in FIG. 5) to determine the actuator position.

Figure 16:
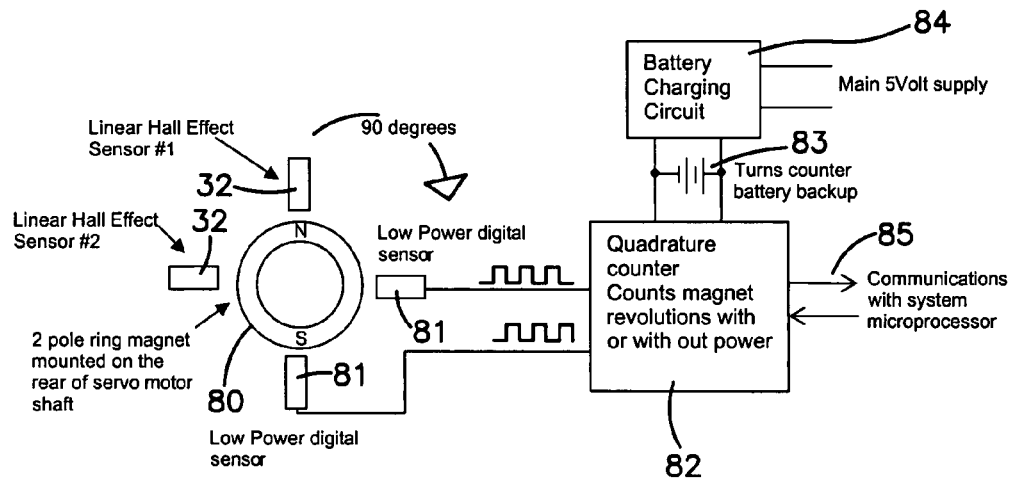
FIG. 16 illustrates an alternative embodiment including a battery backed turns counter.

FIG. 16 illustrates the embodiment more specifically. Here a two pole magnet ring 80 is provided. First and second Hall Effect sensors 32 are located at 90 degrees to one another. Opposing the first and second Hall Effect sensors 32 are two low power digital sensors 81. The output of the digital sensors 81 is provided to quadrature counter block 82. The quadrature counter block 82 is powered by a battery backup 83 such that the system is able to track the output rod of the actuator in a power outage, loss, spike, or other anomaly condition. The battery 83 is kept charged by battery charging circuit block 84 which is connected to an appropriate supply. The quadrature counter block 82 includes communications with the system processor at 85.

Representative Applications and Environments

Some applications and environments in which the present invention might be utilized include: positioning a valve (mechanical input shaft or rod) to control the flow of a liquid, gas or aggregate in accordance with a user's instructions and/or measurement of the actual flows; pressing into place a mechanical part such that a certain position and/or force is realized (e.g., such that there is an assurance that the part has been placed in the specified position and is maintained in that position with adequate friction holding force); controlling the motion of a piston to accurately impart a user's desired fill rate and volume of a liquid into a container or fluid transmission line; to position a work piece on a machine in close coordination with other tooling devices to cut, apply, package, or take other actions to products as they move through the machine; and to create motion to eject product found to be defective in a machine; to position the location of welding heads to properly weld pieces of metal together, among other applications.

While particular embodiments of the invention have been described with respect to its application, it will be understood by those skilled in the art that the invention is not limited by such application or embodiment or the particular components disclosed and described herein. It will be appreciated by those skilled in the art that other components that embody the principles of this invention and other applications therefore other than as described herein can be configured within the spirit and intent of this invention. The arrangement described herein is provided as only one example of an embodiment that incorporates and practices the principles of this invention. Other modifications and alterations are well within the knowledge of those skilled in the art and are to be included within the broad scope of the appended claims.

What is claimed is:

1. A servo system, comprising:
   a. a housing assembly;
   b. an energizable stator supported by the housing assembly;
   c. a shaft rotatably mounted within the housing assembly, the shaft being coupled to a rotor having a first magnet and which is magnetically driven, wherein rotation is imparted to the rotor and thereby to the shaft when the stator is energized;
   d. a rotary to linear conversion device connected to the shaft;
   e. a second magnet mounted on the shaft;
   f. a plurality of analog Hall sensors mounted on the housing assembly for sensing the second magnet, wherein the sensors each provide an output signal;
   g. a controller for energizing the stator and for receiving the output signals, wherein the controller determines the position of the second magnet with respect to the stator from the output signals, and the speed and position of the rotor is controlled from that information; and
   h. a memory for storing a user defined motion program, the motion program including a sequence of move profile instructions, wherein the controller executes the instructions from the memory in the programmed sequence to control the motion of the servo system.

2. The servo system of claim 1, wherein the second magnet is a two-pole ring magnet and is physically located within the housing assembly.

3. The servo system of claim 1, wherein a first and a second Hall Effect sensor are used.

4. The servo system of claim 3, wherein the first and the second Hall Effect sensor are located 90 magnetic degrees apart from one another.

5. The servo system of claim 1 further comprising a communication network for sharing data with other servo systems or a host controller.

6. The servo system of claim 1, wherein the rotary to linear conversion device is a screw type device.

7. The servo system of claim 6, wherein the screw type device is a roller screw.

8. The servo system of claim 7, wherein the roller screw is an actuator.

9. The servo system of claim 6, wherein the screw type device is an actuator.

10. The servo system of claim 9, further including:
    a) an actuator output rod for reciprocal movement relative to the housing; and
    b) a linear position transducer cooperatively connected to the actuator output rod arranged and configured to provide an actual physical position of the output rod.

11. The servo system of claim 1, wherein the first magnet is at least one permanent magnet.

12. A servo control system for a linear actuator, comprising:
    a. a housing assembly;
    b. an energizable stator supported by the housing assembly;
    c. an elongated input shaft rotatably supported relative to the housing, the input shaft having at least a threaded portion, an elongated translating output cylinder with an internally threaded bore, and a roller assembly, the roller assembly including camming surfaces for engaging the threaded portion of the input shaft and the output cylinder, wherein the internal threads of the output cylinder contacting the camming surfaces move the transmission rollers along the threaded extent of the output cylinder in response to the selective rotation of the input shaft, the shaft being coupled to a rotor which includes a first magnet and is magnetically driven, wherein rotation is imparted to the rotor and thereby to the shaft when the stator is energized;
    d. a second magnet mounted on the shaft and located within the housing;
    e. a first and second analog Hall sensor mounted on the housing assembly for sensing the second magnet, wherein the sensor provides an output signal;
    f. a controller for energizing the stator and for receiving the output signal, wherein the controller determines the position of the second magnet with respect to the stator from the output signal, and the speed and position of the rotor is controlled from that information; and g. a linear position transducer cooperatively connected to the output cylinder, the transducer arranged and configured to provide an actual physical position of the output cylinder, wherein the linear position transducer includes a sensing rod and a third magnet located within the output cylinder, the sensing rod being fixed to the housing and the third magnet being fixed to the output cylinder, wherein the third magnet moves along the sensing rod during reciprocal movement of the output cylinder rod.

13. A servo system, comprising:

a. a housing assembly;
b. an energizable stator supported by the housing assembly;
c. a shaft rotatably mounted within the housing assembly, the shaft being coupled to a rotor which is magnetically driven, wherein rotation is imparted to the rotor and thereby to the shaft when the stator is energized;
d. a rotary to linear conversion device connected to the shaft;
e. a magnet mounted on the shaft;
f. an analog Hall sensor mounted on the housing assembly for sensing the magnet, wherein the sensor provides an output signal;
g. a controller for energizing the stator and for receiving the output signal, wherein the controller determines the position of the magnet with respect to the stator from the output signal, and the speed and position of the rotor is controlled from that information; and
h. a position device, including:
   i) a first and a second digital sensor located 90 magnetic degrees apart from one another, and arranged and configured to provide rotation and count information;
   ii) a quadrature counter, the counter connected to the sensors, and arranged and configured to count the output from the first and second digital sensors; and
   iii) a battery for powering the quadrature counter during power disruptions, wherein the position of the rotary to linear device may be determined.

14. A servo control system for a linear actuator, comprising:

a. a housing assembly;
b. an energizable stator supported by the housing assembly;
c. an elongated input shaft rotatably supported relative to the housing, the input shaft having at least a threaded portion, an elongated translating output cylinder with an internally threaded bore, and a roller assembly, the roller assembly including camming surfaces for engaging the threaded portion of the input shaft and the output cylinder, wherein the internal threads of the output cylinder contacting the camming surfaces move the transmission rollers along the threaded extent of the output cylinder in response to the selective rotation of the input shaft, the shaft being coupled to a rotor which is magnetically driven, wherein rotation is imparted to the rotor and thereby to the shaft when the stator is energized;
d. a first magnet mounted on the shaft;
e. a first and second analog Hall sensor mounted on the housing assembly for sensing the first magnet, wherein the sensor provides an output signal;
f. a controller for energizing the stator and for receiving the output signal, wherein the controller determines the position of the first magnet with respect to the stator from the output signal, and the speed and position of the rotor is controlled from that information; and g. a linear position transducer cooperatively connected to the output cylinder, the transducer arranged and configured to provide an actual physical position of the output cylinder, wherein the linear position transducer includes a sensing rod and a second magnet located within the output cylinder, the sensing rod being fixed to the housing and the second magnet being fixed to the output cylinder, wherein the second magnet moves along the sensing rod during reciprocal movement of the output cylinder rod.

15. A servo system, comprising:

a. a housing assembly;
b. an energizable stator supported by the housing assembly;
c. a shaft rotatably mounted within the housing assembly, the shaft being coupled to a rotor having a first magnet and which is magnetically driven, wherein rotation is imparted to the rotor and thereby to the shaft when the stator is energized;
d. a rotary to linear conversion device connected to the shaft, wherein the rotary to linear conversion device is a screw type actuator;
e. a second magnet mounted on the shaft;
f. a plurality of analog Hall sensors mounted on the housing assembly for sensing the second magnet, wherein the sensors each provide an output signal;
g. a controller for energizing the stator and for receiving the output signals, wherein the controller determines the position of the second magnet with respect to the stator from the output signals, and the speed and position of the rotor is controlled from that information;
h. an actuator output rod for reciprocal movement relative to the housing; and
i. a linear position transducer cooperatively connected to the actuator output rod arranged and configured to provide an actual physical position of the output rod, wherein the linear position transducer includes a sensing rod and a third magnet located within the output rod, the rod being fixed to the housing and the third magnet being fixed to the output rod, wherein the third magnet moves along the sensing rod during reciprocal movement of the actuator output rod.

16. A servo system, comprising:

a. a housing assembly;
b. an energizable stator supported by the housing assembly;
c. a shaft rotatably mounted within the housing assembly, the shaft being coupled to a rotor having a first magnet and which is magnetically driven, wherein rotation is imparted to the rotor and thereby to the shaft when the stator is energized;
d. a rotary to linear conversion device connected to the shaft;
e. a second magnet mounted on the shaft;
f. a plurality of analog Hall sensors including first and second Hall Effect sensors mounted on the housing assembly for sensing the second magnet, wherein the sensors each provide an output signal, wherein the first and the second Hall Effect sensor are located 90 magnetic degrees apart from one another, and further comprising third and fourth Hall Effect sensors, wherein the third and fourth Hall Effect sensors are arranged and configured physically opposite the first and second Hall Effect sensors, respectfully, to form a first pair and a second pair, and wherein the outputs of the first and second pairs are provided to differential amplifiers to produce the difference between the first and second pairs; and g. a controller for energizing the stator and for receiving the output signals, wherein the controller determines the position of the second magnet with respect to the stator from the output signals, and the speed and position of the rotor is controlled from that information.

17. A servo system, comprising:
a. a housing assembly;
b. an energizable stator supported by the housing assembly;
c. a shaft rotatably mounted within the housing assembly, the shaft being coupled to a rotor having a first magnet and which is magnetically driven, wherein rotation is imparted to the rotor and thereby to the shaft when the stator is energized;
d. a rotary to linear conversion device connected to the shaft;
e. a second magnet mounted on the shaft;
f. a plurality of analog Hall sensors mounted on the housing assembly for sensing the second magnet, wherein the sensors each provide an output signal;
g. a controller for energizing the stator and for receiving the output signals, wherein the controller determines the position of the second magnet with respect to the stator from the output signals, and the speed and position of the rotor is controlled from that information;
h. a first and a second digital sensor located 90 magnetic degrees apart from one another, and arranged and configured to provide rotation and count information;
i. a quadrature counter, the counter connected to the sensors, and arranged and configured to count the output from the first and second digital sensors; and
j. a battery for powering the quadrature counter during power disruptions, wherein the position of the rotary to linear device may be determined.

18. The servo system of claim 17, further comprising a battery charging circuit, the battery charging circuit cooperatively connected to the battery.

* * * * *